United States Patent Office 3,773,769
Patented Nov. 20, 1973

3,773,769
TETRAHYDRO-OXOFUROQUINOLINE CARBOXYLIC ACID DERIVATIVES
Rudolf Albrecht, Hans-Joachim Kessler, and Eberhard Schroder, Berlin, Germany, assignors to Schering Aktiengesellschaft, Berlin and Bergkamen, Germany
No Drawing. Filed June 15, 1971, Ser. No. 153,406
Claims priority, application Germany, June 18, 1970,
P 20 30 899.0
Int. Cl. C07d 33/48
U.S. Cl. 260—287 R         18 Claims

ABSTRACT OF THE DISCLOSURE

Quinolinecarboxylic acid compounds of the formulae

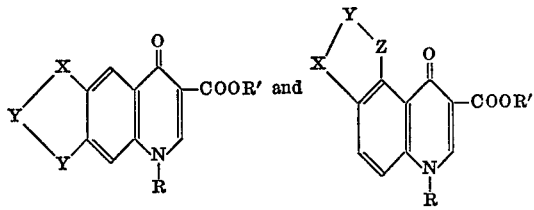

wherein R and R' each are H or alkyl and one of X, Y and Z is —O— and the others are members of the group, consisting of

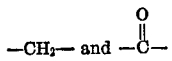

including the acid addition salts thereof, are highly effective against staphylococci and Gram-Negative bacteria. They are produced by cyclizing the corresponding dicarboxylic acid compounds thermally; by cyclizing with POCl to form an intermediate chlorinated quaternary ammonium chloride which is then hydrolyzed; or by hydrogenating the corresponding compounds wherein X and Y or Y and Z are —CH=CH—.

BACKGROUND OF THE INVENTION

This invention relates to novel quinolinecarboxylic acid derivatives, processes for the preparation of these compounds, and the therapeutic use thereof.

The compounds of this invention are similar in structure to oxolinic acid (Proc. 7th Intersc. Conf. Antimicrobial Agents and Chemotherapy, Chicago 1967, p. 475), which has anti-bacterial activity.

SUMMARY OF THE INVENTION

The quinolinecarboxylic acid derivatives of this invention are compounds, singly or mixtures thereof, of Formula I

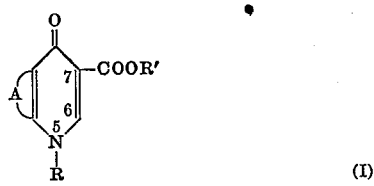

wherein R and R' each are hydrogen or lower alkyl, and A is a bivalent radical of the formula

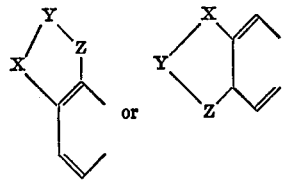

wherein one of X, Y, Z is —O— and the others are members of the group, consisting of

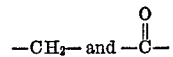

including salts of the carboxylic acids (R'=H) with inorganic or organic bases. As used herein, lower alkyl means containing 1–5 carbon atoms.

DETAILED DISCUSSION

Illustrative of the compounds of this invention are those wherein
  (a) The heterocyclic oxygen atom is in the 1-position, Y and Z are —CH₂—, R' is H and R is H, CH₃, C₂H₅, i—C₃H₇, n—C₃H₇ or n—C₄H₉;
  (b) Compounds corresponding to (a) wherein R' is CH₃, C₂H₅, i—C₃H₇, n—C₃H₇ or n—C₄H₉;
  (c) Compounds corresponding to (a) wherein the heterocyclic atom is in the 3-position, X and Y are —CH₂—;
  (d) Compounds corresponding to (b) wherein the heterocyclic atom is in the 3-position, X and Y are —CH₂—;
  (e) Compounds corresponding to (a) wherein the heterocyclic oxygen atom is in the 2-position, X is —CH₂— and Z is =CO;
  (f) Compounds corresponding to (b) wherein the heterocyclic oxygen atom is in the 2-position, X is —CH₂— and Z is =CO;
  (g) Compounds corresponding to (a) wherein the heterocyclic oxygen atom is in the 2-position, X is =CO and Z is —CH₂—;
  (h) Compounds corresponding to (b) wherein the heterocyclic oxygen atom is in the 2-position, X is =CO and Z is —CH₂—;
  (i) Compounds corresponding to (a) wherein the heterocyclic oxygen atom is in the 2-position, and both X and Z are =CO; and
  (j) Compounds corresponding to (b) wherein the heterocyclic oxygen atom is in the 2-position, and both X and Z are =CO.

When R is hydrogen, the compounds of Formula I can exist in either of its tautomeric forms:

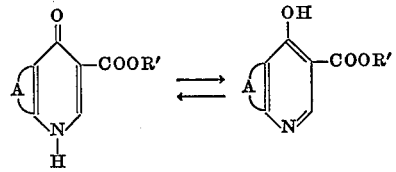

This invention comprises the compounds of Formula I in both their forms.

The compounds of this invention wherein R' is hydrogen, i.e., the free carboxylic acids, can also exist in the form of salts thereof with inorganic or organic bases, preferably those which form pharmaceutically acceptable salts. However, other bases which form toxic salts can be employed for purification, isolation and/or characterization purposes. Examples of salts of inorganic bases are the alkali-metal, e.g., sodium and potassium and alkaline earth, e.g., calcium and ammonium salts. Examples of salts of organic bases are methylammonium, ethylammonium, dimethylammonium, triethylammonium and pyridinium salts. The exact nature of the cation is not critical so long as the base is sufficiently basic to form a stable salt.

The compounds of this invention exhibit a high effectiveness against staphylococci and gram-negative bacteria. The compounds can thus be employed therapeutically in infections produced by these microorganisms, particularly infections of the urinary tract. The compounds of Formula I exhibit a stronger activity against gram-negative bacteria than oxolinic acid, as can be seen from the data in the table below, using as an example of a compound of this invention 5-ethyl-2,3,5,8-tetrahydro-8-oxo-furo-[2,3-g]quinoline-7-carboxylic acid.

TABLE

| Microorganism | Minimum inhibitory concentration [1] | Oxolinic acid (μg./ml.) |
| --- | --- | --- |
| Staphylococcus aureus | 3.1 | 3.1 |
| Escherichia coli | 0.05 | 0.1 |
| Proteus mirabilis | 0.2 | 6.2 |

[1] 5-ethyl-2,3,5,8-tetrahydro-8-oxo-furo[2,3-g]-quinoline-7-carboxylic acid.

The compounds of this invention can be administered in the forms customarily employed in pharmaceuticals. For oral administration, especially suitable are tablets, dragées, capsules, pills, suspensions and solutions. Suitable excipients for tablets are, for example, lactose, amylose, talc, gelatin, magnesium stearate, etc.

For topical administration, suitable are powders, solutions, suspensions, aerosols, and vaginal suppositories. For parenteral application, aqueous and oily solutions or suspensions can be employed.

The compounds of this invention are formulated so as to provide, for example, 0.2 g. to 1.0 g. of the effective agent in admixture with 0.1 to 5 g. of a pharmacologically indifferent excipient, i.e., a pharmaceutically acceptable carrier, per unit dosage, e.g., per tablet.

The novel effective agents are usually administered in amounts of between 2 g. and 6 g. per patient per day.

The novel compounds can be produced as follows:

(a) An aromatic amino compound of Formula II

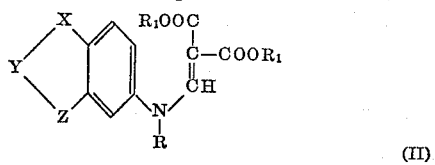

wherein X, Y, Z and R have the values given above, and $R_1$ is lower alkyl, is either cyclized thermally at a temperature above 200° C., to produce an ester of this invention of Formula Ia

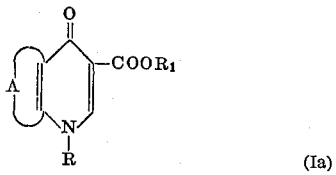

wherein A, R and $R_1$ have the values given above; or is cyclized by heating with phosphorus oxychloride to produce a chlorinated quaternary ammonium salt of Formula Ib

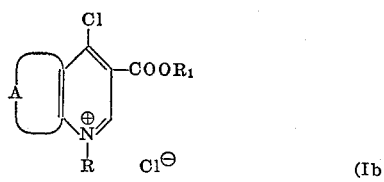

wherein A, R and $R_1$ have the values given above, which is then hydrolyzed to the corresponding acids and esters of this invention ($R_1$=R); or (b) A compound otherwise corresponding to Formula I wherein —X—Y—Z is —O—CH=CH— is catalytically hydrogenated to a compound of Formula I wherein Y and one of X and Z is $CH_2$. The compounds of this invention obtained according to (a) or (b) can then optionally be transesterified, saponified or the nitrogen atom alkylated in the conventional manner, and the free carboxylic acids of this invention optionally can be converted to a water-soluble salts by reaction with inorganic or organic bases.

The thermal cyclization (a) is conducted in a high-boiling solvent or solvent mixture having a boiling point above 200° C. at atmospheric or the selected reaction pressure. Especially suitable is a mixture of 73.5 parts of diphenyl oxide and 26.5 parts of diphenyl ("Dowtherm" A). In this reaction, the cyclization can occur at either of the ring carbon atoms ortho to the nitrogen atom, or both, thus producing a mixture of isomers when the starting aromatic amino compound is assymetric.

The chlorinated ester Ib produced by the cyclization with phosphous oxychloride can be hydrolyzed, in situ or after purification, with dilute acid, e.g., hydrochloric, sulfuric or other mineral or strong organic acid, to the corresponding free carboxylic acid (Ia; $R_1$=H) or, with sodium acetate in dilute acetic acid, to the corresponding esters (Ia; $R_1$=lower alkyl).

The alkylation of a compound of this invention wherein R is H is conducted in an alkaline medium, preferably in water, alcohol, aqueous alcohol, or dimethylformamide, at about 60–100° C. Examples of suitable alkylating agents are alkyl halogenide, dialkyl sulfate, or alkylarylsulfonate.

The catalytic hydrogenation can be effected by dissolving the selected starting compound in a solvent customary for catalytic hydrogenation, such as, for example, acetic acid, methanol, dioxane, or dilute aqueous sodium hydroxide, and hydrogenating this solution with hydrogen at atmospheric or low pressure in the presence of a hydrogenation catalyst, such as, for example, palladium, platinum, or platinum oxide, until 1 mol of hydrogen per mol of starting material has been absorbed.

The starting aromatic amino compounds of Formula II can be produced in a conventional manner from the corresponding amines and alkoxymethylenemalonic esters according to the following equation:

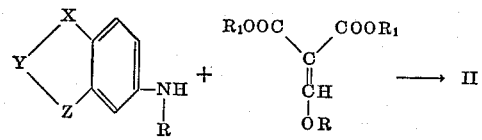

PREPARATIONS (1) 5-(2,2-bisethoxycarbonyl-vinylamino)-2,3-dihydrobenzofuran 8.16 g. of 5-nitrobenzofuran is dissolved in 100 ml. of ethanol and hydrogenated in the presence of 2 g. of palladium/charcoal (5%) until 4 equivalents of $H_2$ have been absorbed. The reaction mixture is filtered, evaporated, and the crude 5-amino-2,3-dihydrobenzofuran (6.1 g.) is heated with 9.82 g. of ethoxymethylenemalonic acid diethyl ester for 3 hours to 100° C., and thereafter maintained for one hour under vacuum at 100° C. The residue is recrystallized from diisopropyl ether. Yield: 7.45 g.; M.P. 65° C.

(2) 4-(2,2-bisethoxycarbonyl-vinylamino)-phthalic acid anhydride 4.88 g. of 4-aminophthalic acid anhydride and 6.48 g. of ethoxymethylenemalonic acid ester are heated for 3 hours to 120° C.; thereafter, all volatile substances are removed under vacuum at a bath temperature of 120° C. The crude product is further processed as such.

(3) 6-(2,2-bisethoxycarbonyl-vinylamino)-phthalide 8.5 g. of 6-aminophthalide is heated with 12.2 g. of ethoxymethylenemalonic acid diethyl ester for 1 hour to 100° C., and the solid reaction product obtained during cooling is recrystallized from ethanol. Yield: 17.0 g.; M.P. 130° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

(a) 2,3-dihydro-8-hydroxyfuro[2,3-g]quinoline-7-carboxylic acid 7.3 g. of 5-(2,2-bisethoxycarbonyl-vinylamino)-2,3-dihydrobenzofuran is refluxed with 73 ml. of phosphorus oxychloride for 1 hour. The reaction mixture is poured on a blend of 750 g. of ice and 15 ml. of concentrated hydrochloric acid, gradually heated, and refluxed for 2 hours. By allowing the cooled mixture to stand, a mixture of substances is crystallized therefrom which is recrystallized from dimethylformamide/ethanol. By repeated recrystallization, 1.7 g. of pure 2,3-dihydro-8-hydroxyfuro[2,3-g]quinoline - 7 - carboxylic acid is obtained; M.P. 290° C.

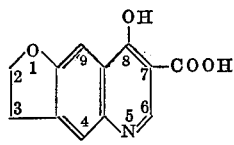

$C_{12}H_9NO_4$ (231.4).—Calculated (percent): C, 62.50; H, 3.93; N, 6.06. Found (percent): C, 62.16; H, 3.72; N, 5.95.

(b) 1,2-dihydro-9-hydroxyfuro[3,2-f]quinoline-8-carboxylic acid

From the mother liquor of the above charge, 0.4 g. of pure 1,2 - dihydro - 9-hydroxyfuro[3,2-f]quinoline-8-carboxylic acid is obtained by renewed recrystallization M.P. 276° C.

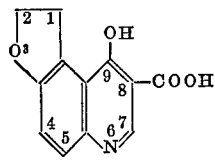

$C_{12}H_9NO_4$ (231.4).—Calculated (percent): C, 62.50; H, 3.93; N, 6.06. Found (percent): C, 62.21; H, 3.70; N, 5.92.

(c) 1,2-dihydro-9-hydroxyfuro[3,2-f]quinoline-8-carboxylic acid 460 mg. of 9-hydroxyfuro[3,2-f]quinoline-8-carboxylic acid is dissolved in 300 ml. of acetic acid; 642 mg. of platinum dioxide is added thereto, and the reaction mixture is hydrogenated until 2 millimols of $H_2$ have been absorbed. The solution is heated, filtered off from the catalyst in the hot state, evaporated, and the residue recrystallized from acetic acid.

EXAMPLE 2

5-ethyl-2,3,5,8-tetrahydro-8-oxo-furo[2,3-g]quinoline-7-carboxylic acid 900 mg. of 2,3-dihydro-8-hydroxyfuro[2,3-g]quinoline-7-carboxylic acid and 765 mg. of potassium hydroxide are dissolved in 2.8 ml. of water and 7.8 ml. of ethanol; 0.96 ml. of ethyl iodide is added thereto, and the reaction mixture is refluxed for 5 days under agitation. The crystalline product obtained after cooling is filtered off and recrystallized from acetic acid. Yield: 400 mg.; M.P. 305-308° C.

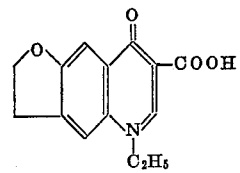

$C_{14}H_{13}NO_4$ (259.3).—Calculated (percent): C, 64.85; H, 5.05; N, 5.40. Found (percent): C, 64.72; H, 4.96; N, 5.36.

EXAMPLE 3

Ethyl ester of 8-hydroxy-1,3-dihydro-1,3-dioxo-furo[3,4-g]quinoline-7-carboxylic acid 10.0 g. of 4-(2,2-bisethoxycarbonyl-vinylamino)-phthalic acid anhydride is refluxed in 100 ml. of "Dowtherm" A for 20 minutes; the product, which crystallizes after cooling, is vacuum-filtered, washed with acetone, and dried under vacuum at 150° C. Yield: 4.5 g.; M.P. >300° C.

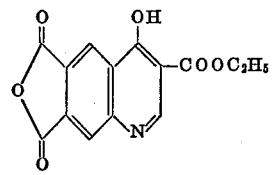

$C_{14}H_9NO_6$ (287.2).—Calculated (percent): C, 58.55; H, 3.16; N, 4.88. Found (percent): C, 58.90; H, 3.32; N, 4.51.

EXAMPLE 4

8-hydroxy-1,3-dihydro-1,3-dioxo-furo[3,4-g]quinoline-7-carboxylic acid 4.5 g. of the ethyl ester of 8-hydroxy-1,3-dihydro-1,3-dioxofuro[3,4-g]quinoline-7-carboxylic acid is refluxed for 2 hours with 50 ml. of 10% strength sodium hydroxide solution, filtered, acidified with concentrated HCl, and recrystallized from water. Yield: 1.35 g.; M.P. 275° C.

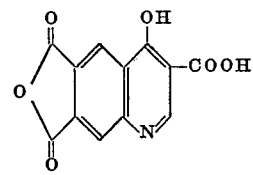

$C_{12}H_5NO_6$ (259.2).—Calculated (percent): C, 55.61; H, 1.94; N, 5.40. Found (percent): C, 55.27; H, 1.93; N, 5.56.

EXAMPLE 5

(a) 6-ethyl-9-oxo-1,2,6,9-tetrahydrofuro[3,2-f] quinoline-8-carboxylic acid

This compound is produced analogously to Example 2 from 300 mg. of 1,2-dihydro-9-hydroxyfuro[3,2-f]quinoline-8-carboxylic acid. The product is recrystallized from acetic acid. Yield: 120 mg.; M.P. 226° C.

(b) 6-ethyl-9-oxo-1,2,6,9-tetrahydrofuro[3,2-f] quinoline-8-carboxylic acid 512 mg. of 6-ethyl-9-oxo-6,9-dihydrofuro[3,2-f]quinoline-8-carboxylic acid is dissolved in 100 ml. of acetic acid and hydrogenated in the presence of 442 mg. of platinum dioxide until 2 millimols of hydrogen have been absorbed. The catalyst is filtered off, the solution is concentrated by evaporation, and the residue is recrystallized from acetic acid.

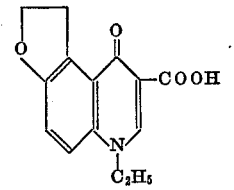

EXAMPLE 6

(a) Ethyl ester of 8-hydroxy-3-oxo-1,3-dihydrofuro[3,4-g]quinoline-7-carboxylic acid 16.6 g. of 6-(2,2-bisethoxycarbonyl-vinylamino)-phthalide is heated in 180 ml. of "Dowtherm" A for 20 minutes, cooled, mixed with n-hexane, and the thus-crystallized product is filtered off. The product is dried at 60° C. under vacuum. Yield: 7.0 g.; M.P. 240° C. (decomposition).

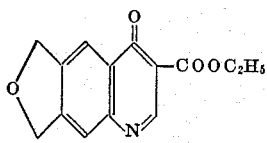

$C_{14}H_{11}NO_5$ (273.3).—Calculated (percent): C, 61.51; H, 4.06; N, 5.12. Found (percent): C, 61.37; H, 3.95; H, 4.98.

(b) Ethyl ester of 9-hydroxy-1-oxo-1,3-dihydrofuro[3,4-f]quinoline-8-carboxylic acid From the mother liquor of the above batch, 2.1 g. of the ethyl ester of 9-hydroxy-1-oxo-1,3-dihydrofuro[3,4-f]quinoline-8-carboxylic acid is obtained; M.P. 229° C. (decomposition).

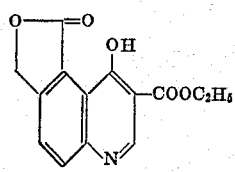

$C_{14}H_{11}NO_5$ (273.3).—Calculated (percent): C, 61.51; H, 4.06; N, 5.12. Found (percent): C, 61.45; H, 3.99; N, 4.87.

EXAMPLE 7

8-hydroxy-3-oxo-1,3-dihydrofuro[3,4-g]quinoline-7-carboxylic acid 14.2 g. of the ethyl ester of 8-hydroxy-3-oxo-1,3-dihydrofuro[3,4-g]quinoline-7-carboxylic acid is refluxed in 140 ml. of sodium hydroxide solution (10% strength) for 2 hours. Then, the reaction mixture is acidified with hydrochloric acid, the solid product is filtered off, recrystallized from dimethylformamide, and dried under vacuum at 110° C. Yield: 8.4 g.; M.P. >280° C.

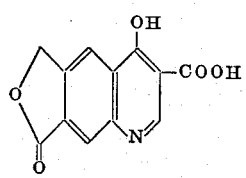

$C_{12}H_7NO_5$ (254.2).—Calculated (percent): C, 58.78; H, 2.88; N, 5.71. Found (percent): C, 58.28; H, 3.13; N, 5.96.

EXAMPLE 8

5-ethyl-3,8-dioxo-1,3,5,8-tetrahydrofuro[3,4-g]quinoline-7-carboxylic acid

This compound is prepared analogously to Example 2 from 2.45 g. of 8-hydroxy-3-oxo-1,3-dihydrofuro[3,4-g]quinoline-7-carboxylic acid. Yield: 1.3 g.; M.P. >275° C.

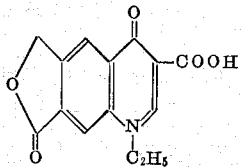

$C_{14}H_{11}NO_5$ (273.2).—Calculated (percent): C, 61.51; H, 4.06; N, 5.12. Found (percent): C, 61.33; H, 3.55; N, 4.78.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to adapt it to various usages and conditions.

What is claimed is:

1. A compound selected from the group consisting of quinolines of the formula

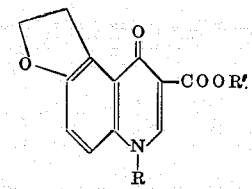

wherein R and R' are each hydrogen or lower alkyl, and the pharmaceutically acceptable salts of the free carboxylic acids thereof wherein R'=H with an organic or inorganic base.

2. A compound of claim 1 wherein R' is hydrogen.
3. A compound of claim 2 wherein R is H, $CH_3$, $C_2H_5$, i—$C_3H_7$, n—$C_3H_7$ or n—$C_4H_9$.
4. A compound of claim 3 wherein R is $C_2H_5$.
5. A compound of claim 1 wherein R' is $CH_3$, $C_2H_5$, i—$C_3H_7$, n—$C_3H_7$ or n—$C_4H_9$.
6. A compound of claim 5 wherein R is H, $CH_3$, $C_2H_5$, i—$C_3H_7$, n—$C_3H_7$ or n—$C_4H_9$.
7. A compound of claim 2 in the form of an ammonium, alkali metal or alkaline earth metal salt.
8. A compound of claim 2 in the form of an organic amine salt.
9. A compound of claim 1, 6-ethyl-9-oxo-1,2,6,9-tetrahydrofuro[3,2-f]quinoline-8-carboxylic acid.
10. A compound selected from the group consisting of quinolines of the formula

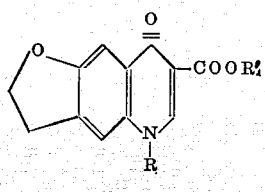

wherein R and R' are each hydrogen or lower alkyl, and the pharmaceutically acceptable salts of the free carboxylic acids thereof wherein R'=H with an organic or inorganic base.

11. A compound of claim 10 wherein R' is hydrogen.
12. A compound of claim 11 wherein is R is H, $CH_3$, $C_2H_5$, i—$C_3H_7$, n—$C_3H_7$ or n—$C_4H_9$.
13. A compound of claim 12 wherein R is $C_2H_5$.
14. A compound of claim 10 wherein R' is $CH_3$, $C_2H_5$, i—$C_3H_7$, n—$C_3H_7$ or n—$C_4H_9$.
15. A compound of claim 14 wherein R is H, $CH_3$, $C_2H_5$, i—$C_3H_7$, n—$C_3H_7$ or n—$C_4H_9$.
16. A compound of claim 11 in the form of an ammonium, alkali metal or alkaline earth metal salt.
17. A compound of claim 11 wherein R' is hydrogen.
18. A compound of claim 10, 5-ethyl-2,3,5,8-tetrahydro-8-oxo-furo[2,3-g]quinoline-7-carboxylic acid.

References Cited

UNITED STATES PATENTS

| | | | |
|---|---|---|---|
| 3,287,458 | 11/1966 | Kaminsky et al. | 260—287 |
| 3,313,818 | 4/1957 | Lesher | 260—287 |
| 3,506,667 | 4/1970 | Kaminsky | 260—287 |
| 3,714,170 | 1/1973 | Dohmore | 260—287 |

FOREIGN PATENTS

| | | | |
|---|---|---|---|
| 1,936,393 | 2/1970 | Germany | 260—287 |
| 1,207,721 | 10/1970 | Great Britain | 260—287 |

OTHER REFERENCES

Kaminsky: Abstracted in Chem. Abstr., vol. 74, Coc 100015e abstracting Germany 2,021,100.

Turner et al.: Proc. 7th Intersci. Cong. Antimicrob. Agents and Chemotherapy, pp. 475–496 (1967).

DONALD G. DAUS, Primary Examiner

U.S. Cl. X.R.

260—286 R, 343.3, 346.7, 347.4, 283.51; 424—258